United States Patent [19]

Neiss

[11] Patent Number: 5,491,836
[45] Date of Patent: Feb. 13, 1996

[54] METHOD AND APPARATUS FOR SELECTIVELY SQUELCHING ANALOG SIGNALS PRODUCED BY A PAGING TERMINAL

[75] Inventor: David A. Neiss, Fort Worth, Tex.

[73] Assignee: Motorola, Inc., Schaumburg, Ill.

[21] Appl. No.: 160,131

[22] Filed: Dec. 2, 1993

[51] Int. Cl.⁶ .................................................. H04Q 3/02
[52] U.S. Cl. .............................. 455/38.5; 340/825.03
[58] Field of Search ............................. 455/38.1, 38.2, 455/38.5, 51.1, 51.2, 53.1; 340/825.44, 825.48, 825.03; 379/56, 57

[56] References Cited

U.S. PATENT DOCUMENTS 4,961,216 10/1990 Baehr ................................. 379/57

Primary Examiner—Reinhard J. Eisenzopf
Assistant Examiner—Marsha D. Banks-Harold
Attorney, Agent, or Firm—Kelly A. Gardner; Daniel K. Nichols; John H. Moore

[57] ABSTRACT

A communication system (200) for providing analog signals comprises a terminal (220) for generating tone and voice signals on tone and voice lines (230, 235), respectively, and a signal processor (205) coupled to the terminal (220) for processing the tone and voice signals. The tone signals are coupled to an analog output (215) when the tone signals are determined to be present on the tone lines (230), and the voice signals are coupled to the analog output (215) when the tone signals are determined to not be present on the tone lines (230).

18 Claims, 3 Drawing Sheets

METHOD AND APPARATUS FOR SELECTIVELY SQUELCHING ANALOG SIGNALS PRODUCED BY A PAGING TERMINAL

FIELD OF THE INVENTION

This invention relates in general to paging systems, and more specifically to paging terminals for producing analog signals.

BACKGROUND OF THE INVENTION

Selective call messaging, such as paging messaging, conventionally involves the use of a paging terminal which compiles paging messages for transmission from a transmitter as a radio frequency (RF) signal. The RF signal is then received by portable paging receivers which decode the signal to recover messages intended for reception by the paging receivers. In typical paging systems, the paging receivers comprise different types of receivers. For example, voice and tone paging receivers can be included in a system for receiving analog data, while alphanumeric and numeric receivers usually receive digital data. Therefore, the paging terminal must, in many systems, be capable of transmitting different types of signals.

Generally, the paging terminal receives paging information from a conventional telephone set coupled to the terminal by a telephone system. The terminal, for each set of information, refers to a subscriber database to determine the paging address of the targeted receiver and the type of message, i.e., voice or tone, that should be transmitted to the targeted receiver. In systems including both tone and voice pagers, the paging terminal has the ability to transmit both tone and voice messages. Conventionally, analog voice signals comprising paging messages are generated on first analog lines during certain time periods, while analog tone signals are generated on second analog lines during other time periods. The terminal does not usually indicate which of the two types of analog signals are generated during each of the times. The signals on these two lines are then scaled independently by a separate controller and summed to produce a single analog output from the controller. This analog output is next provided to the transmitter for transmission to the paging receivers. Because the tone and voice signals are produced at different times, the analog output can include either voice or tone signals, but not both, at any particular time. However, this type of analog message generation is not ideal because, during voice transmissions, noise on the tone lines will be summed with the voice signals and vice versa. As a result, the receivers targeted for reception of analog messages can receive noisy signals that may be difficult for the user to comprehend.

Thus, what is needed is a method and apparatus for reducing noise in analog signals produced by paging terminals which provide both tone and voice signals.

SUMMARY OF THE INVENTION

A method for producing analog signals at an analog output comprises the steps of receiving tone signals on tone lines during first times and receiving voice signals on voice lines during second times. The method further comprises the steps of determining whether the tone signals are present on the tone lines and coupling the tone signals to the analog output when the tone signals are determined to be present on the tone lines.

A communication system for providing analog signals comprises a terminal for generating tone and voice signals on tone and voice lines, respectively, and a signal processor coupled to the terminal for processing the tone and voice signals. The tone signals are coupled to an analog output when the tone signals are determined to be present on the tone lines, and the voice signals are coupled to the analog output when the tone signals are determined to not be present on the tone lines. A transmitter is coupled to the analog output of the signal processor for transmitting the tone and voice signals as RF signals.

DESCRIPTION OF A PREFERRED EMBODIMENT

Figure 1:
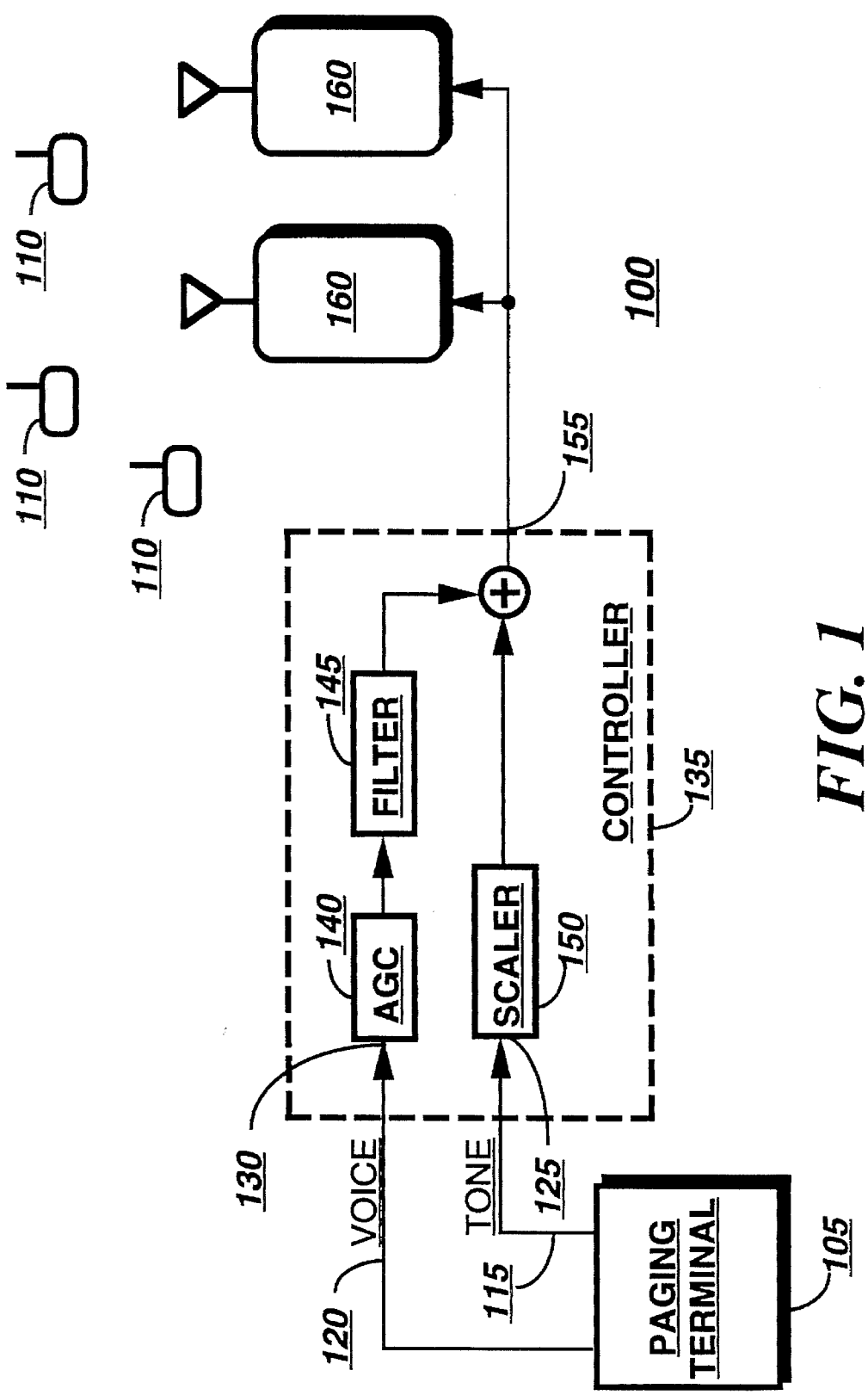
FIG. 1 is a block diagram of a conventional paging system for providing tone and voice signals which are summed into a single analog output.

FIG. 1 is a conventional paging system 100 which provides for radio communication. The paging system 100 comprises a paging terminal 105 for receiving information from a variety of sources, such as conventional telephone sets, modem devices, or data entry devices (not shown). Additionally, the paging system 100 comprises a plurality of receivers 110, e.g., portable paging receivers or transceivers, some of which are intended to receive voice messages and some of which are intended to receive tone messages. The terminal 105 typically receives message information from one of the external sources and encodes the message information into an appropriate analog signal, i.e., either a voice signal or a tone signal. Tone signals are then provided on dedicated tone lines 115, and voice signals are provided on dedicated voice lines 120; however, the terminal 105 typically does not generate both tone and voice signals at the same time, i.e., when tone signals are generated, voice signals are not generated, and vice versa.

The tone lines 115 and the voice lines 120 are coupled to tone and voice inputs 125, 130 of a processing device, such as a transmitter controller 135, which usually comprises an automatic gain control (AGC) circuit 140, or other type of scaling circuit, coupled to the voice input 130 for processing the incoming voice signal to scale it to a predetermined deviation. A filter 145 coupled to the AGC circuit 140 then pre-emphasizes the voice signal for signal-to-noise ratio (SNR) enhancement at the paging receivers 110 in a manner well known to one of ordinary skill in the art. The transmitter controller 135 further comprises a scaler 150 coupled to the tone input 125 for scaling the tone signal to a constant deviation.

Because tone and voice signals are not generated at the same times, processed signals are typically provided to a summer 152 for generating a single analog output 155 on which either tone or voice signals are provided. The analog output 155 is coupled to one or more paging transmitters 160 for transmitting the received analog signal as a radio frequency (RF) signal in a conventional manner. The RF signal is received by receivers 110 located within the coverage areas of the transmitters 160. For each message encoded into the analog signal by the terminal 105, a targeted receiver 110 of the appropriate type, i.e., voice or tone, recovers an analog message from the RF signal.

Conventionally, as described above, the controller 135 simply sums the processed tone and voice signals together, resulting in a single analog output 155 of either a tone signal or a voice signal from the controller 135. It will be recognized that, due to the mutually exclusive nature of the signals, the terminal 105 does not provide an indication of which signal is being generated at a given time. Although the tone and voice signals are generated and processed during different times, noise is usually present on the unused line. For example, during generation and processing of voice signals, noise on the tone lines 115 is still summed with the voice signal. Likewise, during generation and processing of tone signals, noise on the voice lines is amplified by the AGC circuit 140 and summed with the tone signal. As a result, the signal which is currently being processed can be degraded by the noise on the other lines. The targeted receivers 110 which ultimately receive the analog signals may therefore receive tone signals which are degraded to such an extent that a receiver 110 cannot detect the tone signal, causing the user to miss pages.

Figure 2:
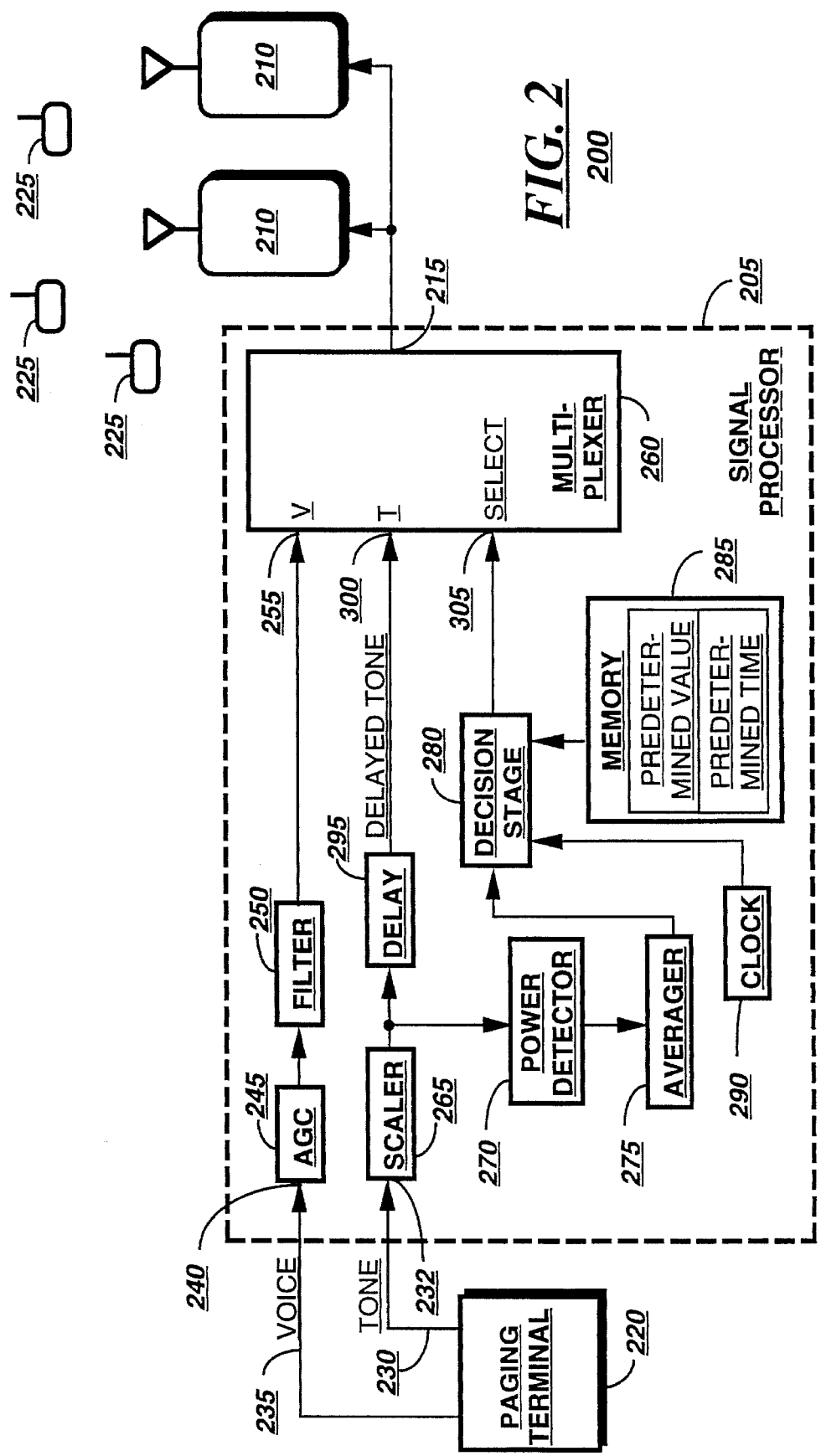
FIG. 2 is a block diagram of a communication system comprising a signal processor for selecting either tone signals or voice signals for coupling to an analog output in accordance with a preferred embodiment of the present invention.

Referring next to FIG. 2, a communication system 200 according to the present invention includes a signal processor 205 for advantageously reducing the amount of noise in voice and tone signals provided to transmitters 210 included in the communication system 200. This is accomplished by employing a selection process, rather than a conventional summing process, to generate an analog signal at an analog output 215 of the signal processor 205.

Preferably, the system 200, which can be a paging system, comprises a terminal 220 for producing both tone and voice signals at outputs therefrom. The terminal 220 can be, for example, an MPS terminal manufactured by Motorola, Inc. of Schaumburg, Illinois for use with a signal processor 205 such as the Advanced Output Processor also manufactured by Motorola, Inc. Alternatively, the terminal 220 can be a MODAX terminal, and the signal processor 205 can be an Advanced Simulcast Controller, both manufactured by Motorola, Inc. The terminal 220 can be implemented using similar devices capable of performing equivalent operations as well. In any event, the terminal 220 receives information, constituting messages intended for reception by receivers 225, from sources such as wired telephone sets, data entry devices, or modem devices. Usually, the terminal 220 collects and stores all messages of a particular type, i.e., voice or tone, until a sufficient number have been collected. Thereafter, all messages of a certain type are encoded to generate an appropriate analog signal. For example, when a predetermined number of voice messages have been received, the terminal 220 generates a voice signal by encoding the voice messages using, for instance, a conventional paging protocol such as the GSC (Golay Sequential Code) signalling format. Similar to the terminal 105 of FIG. 1, the terminal 220 does not generate both voice and tone signals during the same times.

The tone signals generated by the terminal 220 are provided to dedicated tone lines 230 and then to a tone input 232 of the signal processor 205, and the voice signals are provided to dedicated voice lines 235 and from there to a voice input 240 of the signal processor 205.

The signal processor 205 includes a scaling circuit, such as an automatic gain control (AGC) circuit 245, coupled to the voice input 240 of the signal processor 205 for scaling the voice signals to a predetermined average deviation and a filter 250 coupled to the AGC circuit 245 for pre-emphasizing the voice signals to provide enhanced signal-to-noise ratios at receivers 225. The output of the filter 250 is preferably coupled to a first input, i.e., a voice input 255, of a multiplexer 260.

The tone input 232 of the signal processor 205 is coupled to a scaling circuit 265 for scaling incoming tone signals to a predetermined deviation. In accordance with a preferred embodiment of the present invention, the output of the scaling circuit 265 is coupled to the input of a power detector 270, which detects instantaneous power levels of any signals on the tone lines 230 at all times. An averager 275 coupled to the power detector 270 preferably averages the power levels to generate an average value, and a decision stage 280 coupled to the averager 275 monitors the average value to determine when the average value has exceeded a predetermined value for a predetermined time. When the predetermined value has been exceeded for the predetermined time, the decision stage 280 determines that tone signals are present on the tone lines 230, and when the predetermined value has not been exceeded for the predetermined time, the decision stage 280 determines that tone signals are not present on the tone lines 230.

By way of example, if average tone power levels provided by the terminal 220 are approximately zero dB from nominal, acceptable performance will result when the predetermined value is set to negative ten (−10) dB from the reference and the predetermined time is set to approximately thirty (30) ms.

The signal processor 205 preferably further comprises a memory 285, which stores the predetermined value and the predetermined time, and a clock circuit 290, which provides time values to the decision stage 280. The memory 285 preferably comprises a non-volatile memory device, such as a read only memory. The clock circuit 290 can, for instance, include a crystal (not shown) for generating timing signals and a conventional oscillator circuit.

In accordance with the present invention, also included in the signal processor 205 is a delay line 295 coupled to the output of the scaling circuit 265. Preferably, this delay line 295 constitutes a predetermined delay of the tone signals on the tone lines 230 for an amount of time, such as thirty ms, equivalent to the maximum amount of time required for the operation of the power detector 270, the averager 275, and the decision stage 280. The delayed tone signals are provided to a second input, i.e., a tone input 300, of the multiplexer 260.

The output of the decision stage 280 is coupled to a selection input 305 of the multiplexer 260. Preferably, the decision stage 280 generates an indication at the selection input 305 of which of the first and second multiplexer inputs 255, 300 is to be coupled to the analog output 215 of the signal processor 205. By way of example, the decision stage 280 could be designed to generate a low voltage (or no voltage) when the average value of the power levels on the tone lines 230 has not exceeded the predetermined value for the predetermined time, indicating that tone signals are not present on the tone lines 230. When the decision stage 280 determines that tone signals are present, i.e., when the average value exceeds the predetermined value for the predetermined time, a high voltage is provided to the selection input 305 of the multiplexer 260. The multiplexer 260 recognizes the voltage applied at the selection input 305 and couples the appropriate analog signal to the analog output 215, i.e., either the voice signals or the tone signals are coupled to the analog output 215. The analog output 215 is then coupled to transmitters 210 for transmitting the analog signal as an RF signal.

In accordance with the preferred embodiment of the present invention, the signal processor 205 generates either a processed tone signal or a processed voice signal, rather than a summation of the signals on both lines. As a result, when a first type of signal is to be transmitted, noise from the other signal lines is not combined with the desired signal, thereby degrading the desired signal. Instead, the desired analog signal, i.e., either tone or voice, is not affected by noise on the other analog signal lines, so the corresponding RF signals are less erroneous, and messages received by the receivers 225 may be more comprehensible to the user. Additionally, because the decision of whether tone signals are present on the tone lines 230 is determined by averaging power on the lines 230 for a predetermined time period, sporadic noise spikes do not affect the decision process. It will be further recognized that, because the decision is based on the power levels on the tone lines 230, rather than the power levels of the voice lines 235, the decision is more accurate.

The scaling circuits 245, 265 of the signal processor 205 can be implemented using conventional scalers or AGC circuits. Likewise, the multiplexer 260 can be implemented by using any of a variety of well known multiplexers having three inputs and a single output. The delay line 295, the power detector 270, the averager 275, and the decision stage 280 can be implemented in software. As a practical matter, and in accordance with the preferred embodiment of the present invention, the entire signal processor 205 can be implemented using a digital signal processor, such as the DSP56000 manufactured by Motorola, Inc. of Schaumburg, Illi. It will be appreciated, however, that, when a digital signal processor is employed, analog-to-digital converters (not shown) are necessary for converting the analog tone and voice signals to digital signals prior to transfer to the scaler 265 and the AGC circuit 245, respectively. Alternatively, the listed elements can be implemented by an analog signal processor, negating the need for analog-to-digital converters, or by hardwired logic capable of performing equivalent operations. When hardwired logic is utilized, it will be appreciated that the predetermined value and predetermined time may be functions of the hardware involved, and the memory 285 may be unnecessary.

Figure 3:
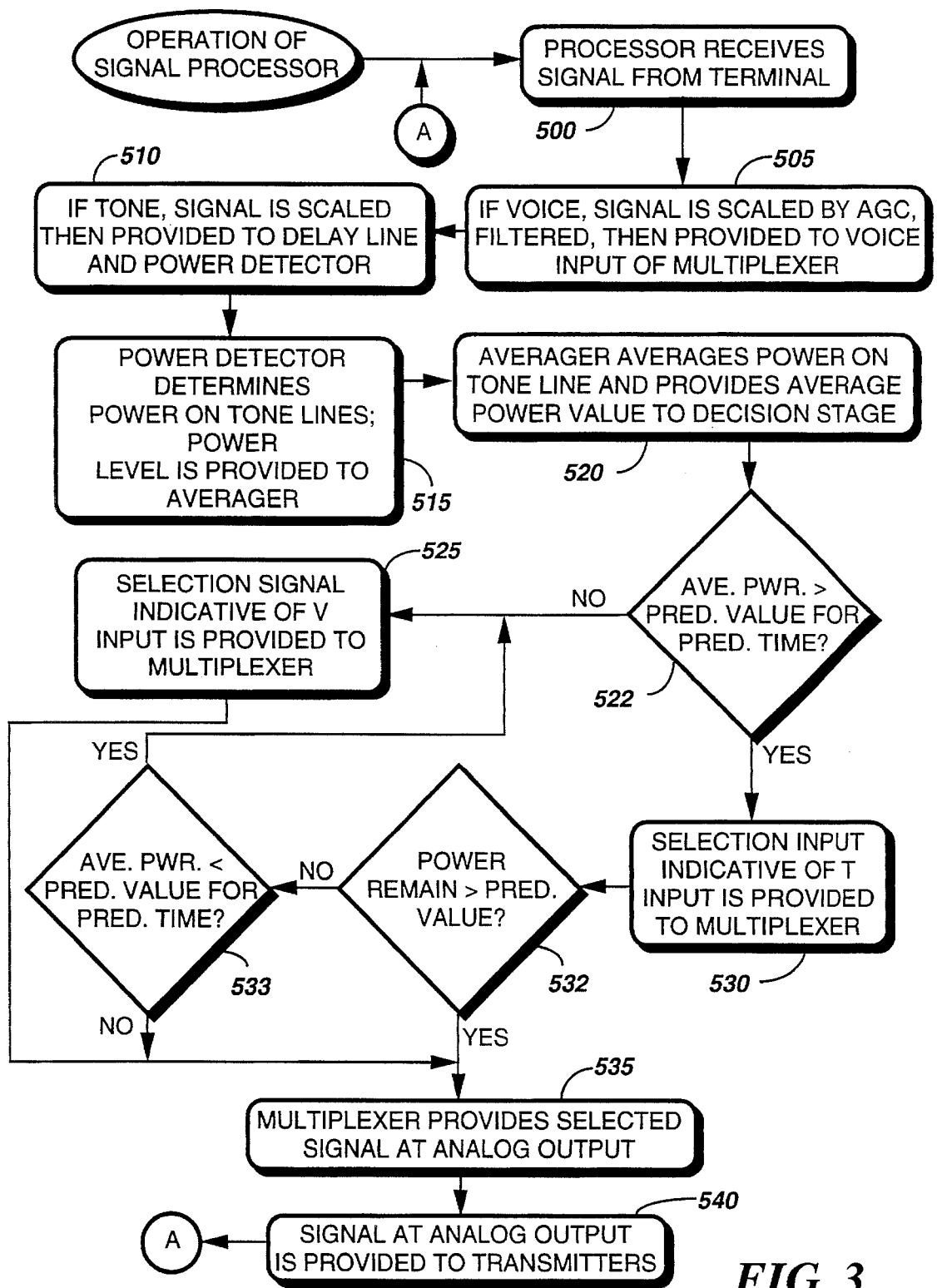
FIG. 3 is a flowchart depicting the operation of the signal processor of FIG. 2 in accordance with the preferred embodiment of the present invention.

FIG. 3 is a flowchart illustrating the operation of the signal processor 205 in accordance with the preferred embodiment of the present invention. Initially, at step 500, the signal processor 205 receives an analog signal from the terminal 220 (FIG. 2). When the signal is received, at step 505, on the voice lines 235, the voice signal is scaled by the AGC circuit 245, filtered, and provided to the voice input 255 of the multiplexer 260. When the signal is received, at step 510, on the tone lines 230, the signal is scaled, delayed, and provided to the tone input 300 of the multiplexer 260.

At all times, the power detector 270, at step 515, preferably determines the power levels of any signals on the tone lines 230 and provides the power levels to the averager 275 (FIG. 2). The averager 275 averages the power levels and, at step 520, provides the average power value to the decision stage 280, which determines, at step 522, whether the average power value has exceeded the predetermined value for the predetermined time. This can be accomplished by appropriate biasing of hardware or, when the decision stage 280 is included in a digital signal processor, by referencing the memory 285 in which the predetermined value and time are stored.

When the average power value has not exceeded the predetermined value for the predetermined time, i.e., when tone signals are not determined to be on the tone lines, the decision stage 280 generates, at step 525, a "selection" signal which is indicative of the voice input 255 (FIG. 2) of the multiplexer 260 and which is transferred to the selection input 305 of the multiplexer 260. Conversely, when the average power value has exceeded the predetermined value for the predetermined time, indicating that tone signals are present, a selection signal indicative of the tone input 300 of the multiplexer 260 is generated, at step 530.

The tone input continues to be selected for as long as the average power level on the tone line remains greater than the predetermined value, at step 532, during which time the tone signal is scaled, delayed, and provided to the tone input 300 of the multiplexer 260. If, however, the average power level drops below the predetermined value and, at step 533, remains less than the predetermined value for the predetermined time, the decision stage 280 selects the voice input 255 of the multiplexer 260, at step 525. As mentioned above, the delay, e.g., 30 ms, on the tone lines 230 is preferably approximately equal to that of the predetermined time such that the decision process takes no greater amount of time than that required for transmission of the tone signals to the multiplexer 260.

In response to the selection signal generated by the decision stage 280, the multiplexer 260, at step 535, couples the selected analog signal, i.e., either tone or voice, to the analog output 215. The signal at the analog output 215 is then provided, at step 540, to the transmitters 210, which transmit the signal as an RF signal for reception by the receivers 225.

In summary, the communication system described above includes a terminal which produces tone and voice signals at different times and on different lines. In accordance with the preferred embodiment of the present invention, a signal processor is coupled to the terminal for receiving and processing the tone and voice signals. The signal processor comprises a multiplexer, first and second inputs of which are coupled to the voice and tone signals, respectively. Additionally, the signal processor comprises decision circuitry for deciding whether tone signals are present on the incoming tone lines from the terminal. When it is determined that tone signals are present, the multiplexer couples the tone signals to a single analog output of the multiplexer. Conversely, when tone signals are not determined to be present, the voice signals are coupled to the analog output. Thereafter, the selected signals are provided to transmitters for transmission therefrom.

The signal processor according to the present invention advantageously selects either the tone signals or the voice signals for transfer to the system transmitters, whereas, in conventional communication systems, the signals on the tone and voice signals are summed. The prior art systems therefore often generate degraded tone or voice signals because noise on the undesired signal lines is summed with the current analog signal. For example, in a conventional system, when tone signals are generated by the terminal, a conventional controller coupled thereto sums the tone signals with noise which has been amplified by the AGC circuit coupled to the voice lines, resulting in degraded tone signals. Unlike the prior art systems, noise on the undesired signals line does not affect the desired signals provided by the signal processor according to the present invention. Consequently, clearer, more understandable signals can be transmitted to receivers within the system, and the receivers are less likely to miss pages.

It may be appreciated by now that there has been provided a method and apparatus for reducing noise in analog signals produced by paging terminals which provide both tone and voice signals.

What is claimed is:

1. A method for producing analog signals at an analog output in a communication system, the method comprising the steps of:

receiving tone signals on tone lines during a first plurality of time periods;

receiving voice signals on voice lines during a second plurality of time periods;

detecting power levels of any signal on the tone lines;

averaging the power levels to provide an average value;

deciding that the tone signals are present on the tone lines when the average value exceeds a predetermined value for a predetermined amount of time;

coupling the tone signals to the analog output when the tone signals are present on the tone lines;

coupling the voice signals to the analog output when the tone signals are not present on the tone lines; and coupling the analog output to a transmitter for transmitting the tone and voice signals provided thereto as a radio frequency (RF) signal.

2. A method for producing analog signals at an analog output, the method comprising the steps of:

receiving tone signals on tone lines during a first plurality of time periods;

receiving voice signals on voice lines during a second plurality of time periods;

determining whether the tone signals are present on the tone lines;

delaying the tone signals when the tone signals are present on the tone lines, wherein the tone signals are delayed by an amount of time approximately equal to that required for the determining step; and coupling the tone signal to the analog output when the tone signals are determined to be present on the tone lines.

3. The method according to claim 2, further comprising the step of:

coupling the voice signals to the analog output when the tone signals are determined to not be present on the tone lines.

4. The method according to claim 2, further comprising the steps of:

transmitting the tone signals as radio frequency (RF) signals when the tone lines are coupled to the analog output; and transmitting the voice signals as the RF signals when the voice lines are coupled to the analog output.

5. The method according to claim 2, wherein the determining step comprises the steps of:

detecting power levels of any signal on the tone lines;

averaging the power levels to provide an average value; and deciding that the tone signals are present on the tone lines when the average value exceeds a predetermined value for a predetermined amount of time.

6. A method in a communication system for providing an analog signal to a transmitter for transmission thereby, the communication system comprising a terminal for receiving messages and producing tone and voice signals in response thereto, a processor for processing the tone and voice signals, and the transmitter for transmitting the tone and voice signals as radio frequency (RF) signals, the method comprising the steps of:

the terminal determining that received messages are to be transmitted either as voice messages or as tone messages and generating in response to the determination either the tone or the voice signals, each on respective tone and voice lines;

the processor receiving the tone signals when generated by the terminal;

the processor receiving the voice signals when generated by the terminal;

the processor determining whether the tone signals are present on the tone lines;

the processor providing the tone signals to the transmitter when the tone signals are determined to be present on the tone lines; and the processor providing the voice signals to the transmitter when the tone signals are determined to not be present on the tone lines.

7. A communication system for providing analog signals, the communication system comprising:

a terminal for generating tone and voice signals on tone and voice lines, respectively, at different times;

a signal processor coupled to the terminal for processing the tone and voice signals, wherein the tone signals are coupled to an analog output when the tone signals are determined to be present on the tone lines, and wherein the voice signals are coupled to the analog output when the tone signals are determined to not be present on the tone lines; and a transmitter coupled to the analog output of the signal processor for transmitting the tone and voice signals as RF signals.

8. The communication system according to claim 7, further comprising:

a plurality of receivers for receiving and decoding the RF signals transmitted by the transmitter.

9. The communication system according to claim 7, wherein the signal processor comprises:

receiving means for receiving the tone and voice signals;

determining means for determining whether the tone signals are present on the tone lines; and coupling means for coupling the tone signals or the voice signals to the analog output in response to the determination made by the determining means.

10. The communication system according to claim 9, wherein the signal processor further comprises delay means coupled to the tone line for delaying the tone signals by an amount of time equal to that required for the determining means to determine whether the tone signals are present on the tone lines.

11. The communication system according to claim 9, wherein the coupling means comprises a multiplexer, which includes first and second inputs to which the tone and voice lines are respectively coupled, a selection input, and the analog output.

12. The communication system according to claim 11, wherein the determining means comprises:

a power detector coupled to the tone lines for determining power levels of any signal on the tone lines;

an averager coupled to the power detector for averaging the power levels to generate an average value; and a decision stage coupled to the averager for determining that the tone signals are present on the tone line when the average value exceeds a predetermined value for a predetermined amount of time.

13. The communication system according to claim 12, wherein the decision stage comprises selection means coupled to the selection input of the multiplexer for generating a first signal, indicating that the tone signals are to be coupled to the analog output, when the tone signals are determined to be present on the tone line, and for generating a second signal, indicating that the voice signals are to be coupled to the analog output, when the tone signals are determined to not be present on the voice line.

14. The communication system according to claim 12, wherein the power detector, the averager, and the decision stage are included in a signal processor.

15. A communication system providing for radio frequency (RF) communication, the communication system comprising:

a terminal for generating tone and voice signals on tone and voice lines, respectively, at different times;

a signal processor coupled to the terminal for processing the tone and voice signals, the signal processor comprising:

receiving means for receiving the tone and voice signals;

determining means for determining whether the tone signals are present on the tone lines; and coupling means for coupling the tone signals to an analog output when the tone signals are determined to be present on the tone lines and for coupling the voice signals to the analog output when the tone signals are determined to not be present on the tone lines;

a transmitter coupled to the analog output of the signal processor for transmitting the tone and voice signals as RF signals; and a plurality of receivers for receiving and decoding the RF signals transmitted by the transmitter.

16. The communication system according to claim 15, wherein the signal processor further comprises delay means coupled to the tone line for delaying the tone signals.

17. The communication system according to claim 15, wherein the coupling means comprises a multiplexer, which includes first and second inputs to which the tone and voice lines are respectively coupled, a selection input, and the analog output.

18. The communication system according to claim 17, wherein the determining means comprises:

a power detector coupled to the tone lines for determining power levels of any signal on the tone lines;

an averager coupled to the power detector for averaging the power levels to provide an average value; and a decision stage coupled to the averager for determining that the tone signals are present on the tone line when the average value exceeds a predetermined value for a predetermined amount of time and for providing an appropriate indication at the selection input of the multiplexer.

* * * * *